Figure 1:
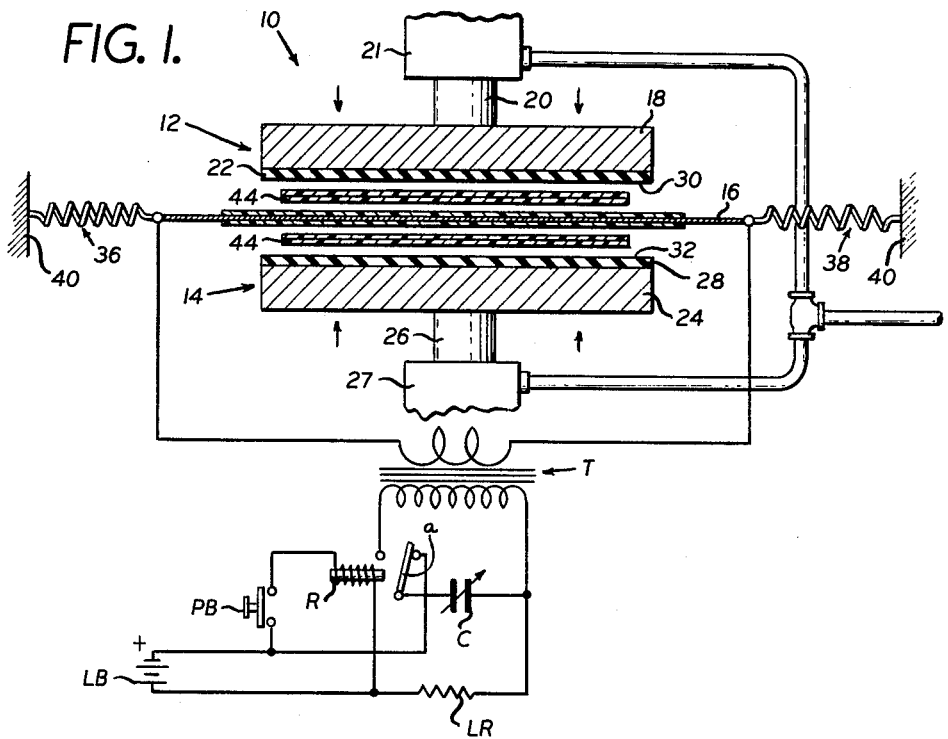

Oct. 24, 1961 S. L. STARGER ET AL 3,005,402
APPARATUS FOR HEAT SEALING A PLURALITY OF
PAIRS OF SHEETS OF THERMOPLASTIC
MATERIAL AT THE SAME TIME
Filed March 19, 1958 2 Sheets-Sheet 1

INVENTORS
SAMUEL L. STARGER
ROLAND M. LEVIN
IVAN J. GARSHELIS
BY Hubbell and Cohen
ATTORNEYS.

INVENTORS
SAMUEL L. STARGER
ROLAND M. LEVIN
IVAN J. GARSHELIS
BY *Hubbell and Cohen*
ATTORNEYS.

United States Patent Office 3,005,402
Patented Oct. 24, 1961

3,005,402
APPARATUS FOR HEAT SEALING A PLURALITY OF PAIRS OF SHEETS OF THERMOPLASTIC MATERIAL AT THE SAME TIME
Samuel L. Starger, Clark, Roland M. Levin, Linden, and Ivan J. Garshelis, Clark, N.J., assignors to Research Associates, Inc., Linden, N.J., a corporation of New York
Filed Mar. 19, 1958, Ser. No. 722,586
15 Claims. (Cl. 100—93)

This invention relates to the heat sealing of thermoplastic material and particularly to an improved method and apparatus for heat sealing a plurality of pairs of sheets of thermoplastic material at the same time.

In recent years there has been a great deal of interest in the art of heat sealing two side-by-side thermoplastic sheets or films to form bags and other articles, the heat seal normally providing edge seams for these articles. Among the thermoplastic sheets or films which adapt themselves to heat sealing are rubber hydrochloride, copolymers of vinyl chloride and vinyl acetate, polyethylene and vinylidene chloride. These are but a few examples of thermoplastic film suitable for this process and many other types of thermoplastic film are available.

In the art as developed to date, a Nichrome (nickel chromium alloy) wire is mounted on the face of a stationary plate, the ends of the Nichrome wire being connected to suitable electrical input means such as a constant current source or an impulse source if thermal impulse type heating is employed. In spaced relation to the face of the stationary plate heretofore mentioned is a movable plate. Two layers of thermoplastic film are moved between the two plates and the movable plate is then moved toward the stationary or fixed plate to apply pressure to the two layers of film. The heat of the Nichrome wire causes the thermoplastic material immediately adjacent thereto to become soft and to weld together and thus form a seal. One of the more common forms for the two layers of thermoplastic film to take is that of an extruded tube of thermoplastic material which is so flaccid that the tube normally lies flat to provide two side-by-side film layers which are connected along the longitudinal edges. With such a raw material, it is usual to provide a seal extending transverse of the length of the tube to thereby produce a bag open on one transverse edge but closed on all other edges thereof. Naturally, after the seal has been effected, the bag thus formed is cut from the remaining stock by any suitable cutting means, such as a movable knife.

While the machine and method just described constitute a convenient means and method for achieving the desired result, they have a number of limitations, particularly as to rate of production and power requirements. With the construction presently in use, only one pair of thermoplastic films may be joined together with one operation of the movable pressure plate. Moreover, as the heat generated by the electrical heating element (the Nichrome wire) is emitted in all directions, a substantial amount of this heat is not used to cause the thermoplastic film to become soft but, instead, is conducted away from the thermoplastic film by the stationary plate on which the heating element is mounted.

The major object of the present invention is the provision of a new and improved apparatus for heat sealing thermoplastic films.

Another object of the present invention is the provision of a new and improved apparatus for simultaneously heat sealing a plurality of pairs of thermoplastic films to one another.

Still another object of the present invention is the provision of a new and improved apparatus for heat sealing thermoplastic film, which apparatus consumes a reduced amount of electrical energy per seal.

Yet a further object of the present invention is the provision of a new and improved method for heat sealing thermoplastic film.

The above and other objects, characteristics and features of the present invention will be more fully understood from the following description taken in connection with the accompanying illustrative drawings.

Figure 2:
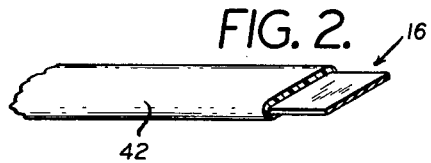
Figure 3:
Figure 4:
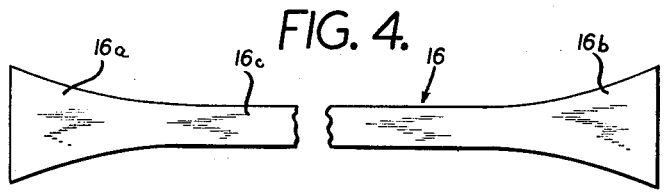
Figure 5:
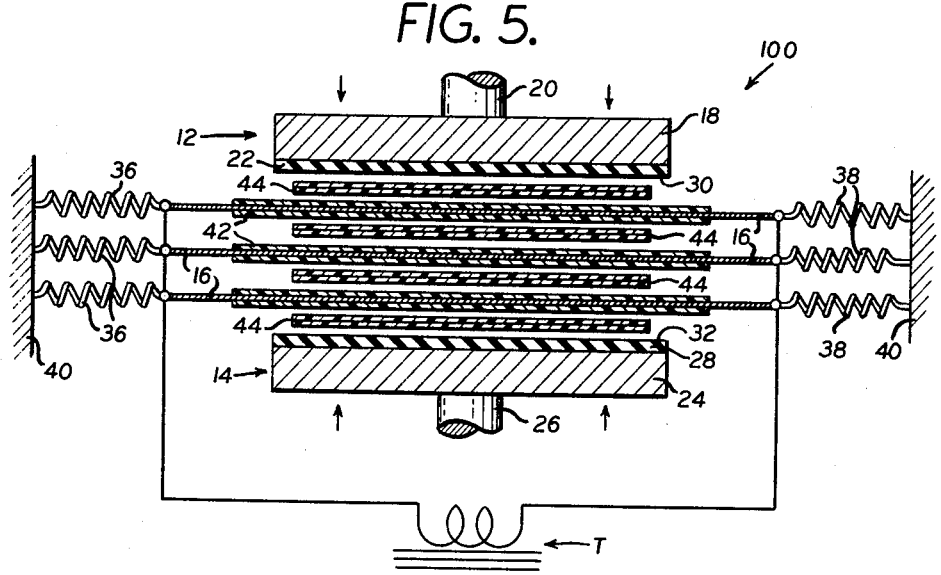
Figure 6:
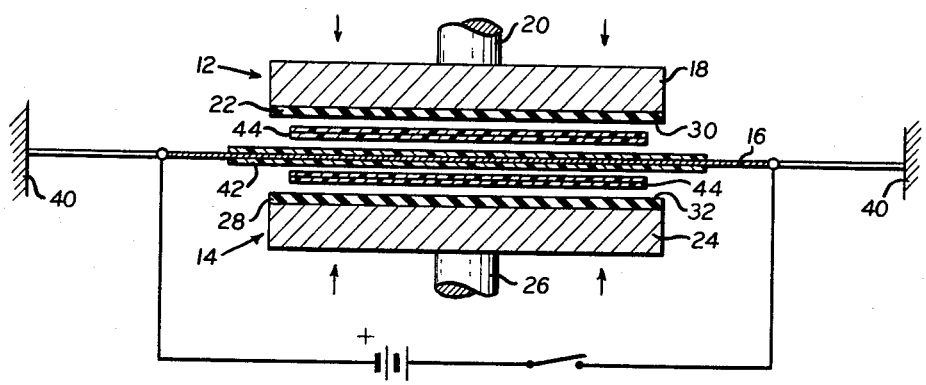

In the drawings:
FIG. 1 is a diagrammatic view, partly in section, of apparatus embodying one form of the present invention;
FIG. 2 is a fragmentary perspective view of a heating element employed in the apparatus shown in FIG. 1;
FIG. 3 is a sectional view of a modified form of heating element embodying the present invention;
FIG. 4 is a plan view of another form of heating element embodying the present invention;
FIG. 5 is a view similar to FIG. 1, showing another form of apparatus embodying the present invention; and
FIG. 6 is still another view similar to FIG. 1, showing another form of apparatus embodying the present invention.

Referring now to the drawings in detail and particularly to FIG. 1 thereof, the apparatus embodying the present invention is herein generally designated by the reference numeral 10. Apparatus 10 comprises a first pressure means 12 and a second pressure means 14 between which is disposed a heating element 16. Pressure means 12 includes a rigid plate 18, preferably made of metal such as aluminum, which is connected to a longitudinally reciprocably movable shaft 20 which is movable upwardly and downwardly by any suitable means 21, such as hydraulic, solenoid or motor means. The lower surface of pressure means 12 is faced with a relatively pliable material facing 22, such as of rubber or other similar materials. Lower pressure means 14 is constructed substantially identically to upper pressure means 12. That is, lower pressure means 14 includes a flat rigid plate 24 preferably made of metal such as aluminum, a vertically reciprocably movable shaft 26 which imparts a reciprocable movement to the pressure means by means of apparatus 27 similar to means 21 mentioned above, and a facing 28 which is made of rubber or the like.

The apparatus in FIG. 1 is shown in its open position in which the bottom surface 30 of facing 22 is spaced a substantial distance from the upper surface 32 of facing 28. Disposed equidistant between the surfaces 30 and 32 is the electrical heating element 16 which is made of relatively high resistance conducting material such as the nickel chromium alloy known in the trade as Nichrome. The Nichrome heating element 16 extends outwardly on both sides of the projected area of the pressure means 12 and 14 and the ends thereof are connected to tension springs 36 and 38, which in turn are connected to some fixed body such as, for instance, the housing 40 of the apparatus 10. Springs 36 and 38 subject heating elements 16 to substantial tension to keep it properly positioned.

As shown in FIG. 2, the Nichrome heating element 16 is a band or ribbon-like element with its horizontal surfaces, that is the surfaces parallel to surfaces 30 and 32, being substantially wider than the thickness of the heating element. Overlying the upper and lower surfaces of the heating element 16 is a suitable abrasion resistant covering or coating which is adapted to refrain from adhering to the softened thermoplastic film. As shown herein, this coating is in the form of a sleeve 42 made of a material having a relatively low coefficient of friction which will not adhere to the heated thermoplastic film. Two examples of such material are polytetrafluoroethylene and polytrifluorochloroethylene known respectively in the trade as Teflon and Kel–F.

The heating element 16 is disposed between the pressure means 12 and 14 and is spaced substantially equidistant therebetween. The path of movement of the pressure means 12 and 14 is sufficiently great so that the spaces between heating element 16 and surfaces 30 and 32 readily permit the passage of two side-by-side films or sheets 44 of thermoplastic material between the heating element 16 and the surface 30 and between the heating element 16 and the surface 32 of the pressure means. With such an arrangement, two pairs of films may be brought into close relation with the heating element at the same time.

As shown in FIG. 1, the power supply for the heating element 16 is of the impulse type. Such a power supply includes any suitable source of D.C. energy, such as a battery LB, a control relay R, a capacitor C, a current limiting resistor LR and a transformer T. To actuate the apparatus as shown herein, a suitable switch means such as a simple normally open push button PB is incorporated, although automatic means may be employed to perform its function. The energizing circuit for the relay R may be traced from the positive terminal of the D.C. source, over the push button contact PB, through the winding of the relay R, to the negative terminal of the D.C. source. The energizing circuit for the capacitor C may be traced from the positive terminal of the D.C. source, over the back contact a of relay R, through the capacitor, through the resistor LR, to the negative terminal of the D.C. source. With a circuit of the type described, the capacitor C is normally charged to the voltage of the direct current source. When it is desired to heat the element 16, push button PB is closed to energize the relay R to cause it to pick up and thus open the energizing circuit for the capacitor C over the back contact a of relay R, and close a discharge circuit for capacitor C which may be traced from the right hand terminal of capacitor C, through the primary winding of transformer T, and over front contact a of relay R, to the left hand terminal of capacitor C. As is well known to those skilled in the art, this discharge circuit is a simple capacitor-inductance circuit which will set up oscillations for a short period of time. These oscillations are transferred to the secondary winding of the transformer T and from the secondary through the heating element 16. The capacitor C and the transformer primary and secondary windings are so proportioned that the oscillations flowing through the secondary circuit of the transformer will heat the heating element 16 to a point which will cause the thermoplastic films to soften and bond together.

The operation of the mechanism is as follows: A pair of thermoplastic films 44 is disposed between the surface 30 of pressure means 12 and the heating element 16 and another pair of thermoplastic films 44 is disposed between the heating element 16 and surface 32 of pressure means 14. Naturally, at this time, the pressure means are in their open positions as shown in FIG. 1. With the films so disposed, the pressure means 12 and 14 are moved towards each other to compress both pairs of thermoplastic films 44 between their adjacent surfaces 30 and 32 and the upper and lower surfaces of heating element 16. The resilient facings are used because it is difficult to have rigid surfaces carefully aligned to provide an equal pressure along the entire length of the heating element 16. With the soft resilient or pliable facings 22 and 28, the facings automatically adjust themselves to supply relatively uniform pressure over the entire portion of the surfaces of the two pairs of films within the projected area of heating element 16. With the pressure means compressing the two pairs of film between them and the heating element 16, push button PB is closed to pick up relay R and thus open the charging circuit for capacitor C and close the discharge circuit which, as heretofore explained, will pass current through the heating element 16 and thus heat it to the point where the thermoplastic films soften and weld together. With this construction, it will be seen that the heat generated by the heating element 16 will be used to seal thermoplastic material regardless of whether the heat tends to move upwardly or downwardly by conduction. This greatly increases the efficiency of this apparatus over apparatus heretofore known in the prior art.

As is well known, when Nichrome wire is heated it tends to expand and this expansion might well subject the Nichrome wire to compressive stresses. However, the Nichrome wire has a relatively low compression strength when compared to its tensile strength. Moreover, if the Nichrome is cycled from being under tension to being under compression, it soon will break due to fatigue. This tendency towards fatigue is reduced if the Nichrome wire is constantly kept under tension.

To reduce the tendency of the Nichrome heating element 16 to be subjected to compressive forces, it is presently preferred to heat the Nichrome heating element 16 prior to the closing of the pressure means 12 and 14. Preferably, this heating should be done just prior to the closing and in a machine of the type shown in FIG. 1, the heating can be achieved during the time the pressure means 12 and 14 are moving toward one another merely by timing the closing of the push button PB to coincide with the initiation of movement of pressure means 12 and 14 toward each other. By energizing the heating element at this time, the heating element will have an opportunity to thermally expand without restriction resulting from the pressure of the two pressure means 12 and 14 and thus obviate the possibility of certain portions of the heating element underlying the pressure means being subjected to compressive stresses. Springs 36 and 38 subject heating element 16 to sufficient tension to assure that it will remain under tension even after it has expanded due to heating. In this connection and as is shown in FIG. 6, the springs may be completely eliminated if the heating is accomplished prior to the closing of the pressure means.

To further reduce the consumption of electrical power per seal, the end portions 16a and 16b of heating element 16 are preferably arranged to have a substantially lower electrical resistance than the center portion 16c, which portion actually comes into engagement with the thermoplastic films 44. By so arranging the electrical resistance, there will be comparatively little heat lost in those end zones 16a and 16b of heating element 16 and substantially all of the heat generated by the heating element will be generated in situ with the thermoplastic films. This may be accomplished in several ways. As shown in FIG. 3, the Nichrome heating element is provided on its end portions 16a and 16b with a plating 46 which is preferably of a low resistance material, such as copper or silver. A good electrical connection must be maintained between the platings 46 and the Nichrome itself and this may be achieved by electrodepositing the plate 46 on the end portions 16a and 16b of the heating element. In lieu of the plating shown in FIG. 3, the end portions 16a and 16b of Nichrome heating element 16 may be provided with a larger cross section than the central portion 16c, which larger cross section will result in a reduction in electrical resistance in the end portions. As shown herein, the increased cross section of the ends 16a and 16b is achieved by widening the Nichrome heating element 16 at the end portions, although a thickening may be used in lieu thereof.

Referring now to FIG. 5, a modified form of apparatus 10 herein designated as apparatus 100 is shown. Apparatus 100 is generally the same as apparatus 10 with the following differences. In lieu of a single heating element 16 disposed between the pressure means 12 and 14, a plurality of spaced heating elements 16 are provided. The spaces between each of the heating elements and between the upper and lower heating elements and the surfaces 30 and 32, respectively, when pressure means 12 and 14 are spaced at a maximum distance from each other, are sufficient to permit the ready passage of pairs of thermoplastic films 44 therethrough. As shown herein, all of the heating elements are energized in multiple by a source of impulse current identical with that shown in FIG. 1. Of course, a series connection can be used or, in lieu thereof, a plurality of independent sources of energy can be employed. By extending the apparatus shown in FIG. 1 in the manner shown in FIG. 5, many more pairs of films 44 may be bonded at the same time and each adjacent pair of heating elements operates to supply heat to adjacent pairs of films to thereby greatly increase the electrical efficiency of the apparatus. Naturally, if desired, each of the heating elements 16 may be arranged to have relatively low electrical resistance in its end portions and relatively high electrical resistance in its central portion so as to concentrate the generation of heat in the area where it is needed and to reduce the heat losses outside of the pressure means to a minimum. It should be noted that the spring mountings 36—38 permit movement of the several heating elements toward and away from each other as the pressure means 12 and 14 move respectively toward and away from each other to thereby permit the simultaneous application of pressure on all pairs of films.

To operate apparatus 100, with the pressure means 12 and 14 in their separated positions as shown in FIG. 5, a plurality of pairs of sheets of thermoplastic material may be positioned therein, one pair between pressure means 12 and the uppermost heating element, a pair between each adjacent pair of heating elements, and a pair between the lowermost heating element and pressure means. With the thermoplastic film so positioned, the actuating means for the pressure means 12 and 14 may be energized to commence moving the pressure means towards one another to thereby simultaneously apply pressure to all of the pairs of thermoplastic sheets disposed within the apparatus. Due to application of force by the pressure means on the heating elements, the outside heating elements will move towards the center heating element and thus move the sheets in between towards the center heating element.

As pointed out hereinbefore, the movement of the heating elements is facilitated by the spring mountings, although other movable mountings may be used. In accordance with the preferred method of heating the thermoplastic sheets, prior to the pressure means actually applying substantial pressure to the sheets the heating elements should be energized to bring them up to a temperature sufficient to soften the thermoplastic material so that the welding or sealing of each associated pair of sheets will be effected upon the application of pressure. In the alternative, of course, the heating may be done after the pressure means apply pressure although, as pointed out hereinbefore, this is not wholly desirable. Furthermore, if desired, a constant supply of electrical energy to the heating elements may be employed rather than the impulse supply shown in FIG. 1. When the thermoplastic sheets are pressed against the constantly heated heating elements, there will be sufficient conduction of heat away from the heating elements by the thermoplastic material to substantially cool the heating elements whereby to permit the thermoplastic material to set in its sealed condition. After the sealing is effected, the pressure means 12 and 14 are retracted to release the sealed thermoplastic material, the sheets are advanced to condition the apparatus for subsequent operation. Suitable cutting means, either manual or automatic, are employed to cut the sealed article away from the unsealed stock.

Referring now to FIG. 6, the apparatus shown is substantially identical to that shown in FIG. 1 with the exception that the source of power for heating element 16 is a continuous source, either A.C. or D.C. With the heating element being constantly energized, the spring mountings may be dispensed with and rigid mountings may be substituted therefor to connect the heating element to the chassis of the machine. This substitution may be made when constant energization of the heating element is employed because with the heating element constantly energized, there will be little or no tendency for it to expand and contract so as to alternately set up tensile and compressive forces in the heating element which might cause failure thereof. The variation in temperature of the heating element due to the conduction of heat away from the heating element by the thermoplastic sheet material will not be so great as to cause this cycling and the rigid mountings can be arranged to subject the heating element to sufficient tension so as to prevent compressive stresses from being set up in the heating element. In this connection it should be understood that if a thermal impulse heating method is employed and if the power supply is operated prior to the pressure means 12 and 14 closing, then the arrangement for mounting the heating element 16 may be precisely as that shown in FIG. 6 rather than employing the spring mounting shown in FIG. 1.

It will be understood that the thermoplastic sheet or tube material used is preferably to be fed automatically into the machine by suitable automatic feeding apparatus presently known and available on the market. The feeding will operate in timed relation with the operation of the pressure means. Of course, hand feeding of the sheets may be employed, if desired.

While we have herein shown and described several forms of our invention and have suggested modifications therein, various changes and modifications may be made therein within the scope of the appended claims without departing from the spirit and scope of this invention.

Having now described our invention, what we claim as new and desire to secure by Letters Patent, is:

1. Apparatus for heat sealing flaccid thermoplastic sheets to one another, comprising a heating element, a first pressure means movable relative to said heating element to and from a first position in which said first pressure means applies a force to said heating element in a preselected direction and to and from a second position in which said first pressure means is spaced from said heating element, a second pressure means movable relative to said heating element to and from a first position in which said second pressure means applies a force to said heating element in a direction opposite to said preselected direction and to and from a second position in which said second pressure means is spaced from said heating element, the spaces between said heating element and said first and second pressure means when said first and second pressure means are in their respective second positions each being adapted to permit the passage of a pair of superposed thermoplastic sheets therethrough, and means for concomitantly moving said first and second pressure means in opposite directions relative to said heating element so that both said pressure means are simultaneously in their respective first positions and both said pressure means are simultaneously in their respective second positions.

2. Apparatus for heat sealing flaccid thermoplastic sheets, comprising a heating element having first and second opposed surfaces, a first pressure means movable relative to said heating element to and from a first position in which said first pressure means applies a force to said first surface of said heating element and to and from a second position in which said first pressure means is spaced from said first surface of said heating element, a second pressure means movable relative to said heating element to and from a first position in which said second pressure means applies a force to said second surface of said heating element and to and from a second position in which said second pressure means is spaced from said second surface of said heating element, the spaces between said first pressure means and said first surface of said heating element and between said second pressure means and said second surface of said heating element when said first and second pressure means are in their respective second positions each being adapted to permit the passage of a pair of superposed thermoplastic sheets therethrough, and means for concomitantly moving said first and second pressure means in opposite directions relative to said heating element so that both said pressure means are simultaneously in their respective first positions and both said pressure means are simultaneously in their respective second positions.

3. Apparatus for heat sealing flaccid thermoplastic sheets, comprising a heating element, a first pressure means movable relative to said heating element to and from a first position in which said first pressure means applies a force to said heating element in a preselected direction and to and from a second position in which said first pressure means is spaced from said heating element, a second pressure means movable relative to said heating element to and from a first position in which said second pressure means applies a force to said heating element in a direction opposite to said preselected direction and to and from a second position in which said second pressure means is spaced from said heating element, the spaces between said heating element and said first and second pressure means when said first and second pressure means are in their respective second positions each being adapted to permit the passage of a pair of superposed thermoplastic sheets therethrough, and means for concomitantly moving said first and second pressure means in opposite directions relative to said heating element so that both said pressure means are simultaneously in their respective first positions and both said pressure means are simultaneously in their respective second positions, said heating element having an end portion disposed outside of the projected area of said pressure means, and means operatively connected to the free end of said end portion for tensioning said heating element.

4. Apparatus for heat sealing flaccid thermoplastic sheets, comprising a heating element, a first pressure means movable relative to said heating element to and from a first position in which said first pressure means applies a force to said heating element in a preselected direction and to and from a second position in which said first pressure means is spaced from said heating element, a second pressure means movable relative to said heating element to and from a first position in which said second pressure means applies a force to said heating element in a direction opposite to said preselected direction and to and from a second position in which said second pressure means is spaced from said heating element, the spaces between said heating element and said first and second pressure means when said first and second pressure means are in their respective second positions each being adapted to permit the passage of a pair of superposed thermoplastic sheets therethrough, and means for concomitantly moving said first and second pressure means in opposite directions relative to said heating element so that both said pressure means are simultaneously in their respective first positions and both said pressure means are simultaneously in their respective second positions, said heating element having its two end portions disposed outside of the projected area of said pressure means, and a pair of springs, one of said springs being operatively connected to the free end of each of said end portions for tensioning said heating element.

5. Apparatus in accordance with claim 4, wherein the end portions of said heating element have relatively low electrical resistance and at least a part of the portion of said heating element disposed within the projected area of said pressure means being of relatively high electrical resistance.

6. Apparatus in accordance with claim 4, wherein said heating element is made of relatively high resistance electrical conducting material, and a low resistance plating overlies said end portions of said heating element to reduce the electrical resistance thereof.

7. Apparatus in accordance with claim 4, wherein the cross section of said end portions of said heating element are substantially larger than the cross section of at least a part of the portion of said heating element within the projected area of said pressure means.

8. Apparatus for heat sealing flaccid thermoplastic sheets, comprising a heating element having first and second opposed surfaces, a first pressure means movable relative to said heating element to and from a first position in which said first pressure means applies a force to said first surface of said heating element and to and from a second position in which said first pressure means is spaced from said first surface of said heating element, a second pressure means movable relative to said heating element to and from a first position in which said second pressure means applies a force to said second surface of said heating element and to and from a second position in which said second pressure means is spaced from said second surface of said heating element, the spaces between said first pressure means and said first surface of said heating element and between said second pressure means and said second surface of said heating element when said first and second pressure means are in their respective second positions each being adapted to permit the passage of a pair of superposed thermoplastic sheets therethrough, and means for concomitantly moving said first and second pressure means in opposite directions relative to said heating element so that both said pressure means are simultaneously in their respective first positions and both said pressure means are simultaneously in their respective second positions, and a coating overlying at least a portion of said first and second surfaces of said heating element, said coating being made of a material which resists adhering to said thermoplastic sheets.

9. Apparatus for heat sealing flaccid thermoplastic sheets, comprising a heating element, a first pressure means movable relative to said heating element to and from a first position in which said first pressure means applies a force to said heating element in a preselected direction and to and from a second position in which said first pressure means is spaced from said heating element, a second pressure means movable relative to said heating element to and from a first position in which said second pressure means applies a force to said heating element in a direction opposite to said preselected direction and to and from a second position in which said second pressure means is spaced from said heating element, the spaces between said heating element and said first and second pressure means when said first and second pressure means are in their respective second positions each being adapted to permit the passage of a pair of superposed thermoplastic sheets therethrough, and means for concomitantly moving said first and second pressure means in opposite directions relative to said heating element so that both said pressure means are simultaneously in their respective first positions and both said pressure means are simultaneously in their respective second positions, and a sleeve disposed on at least a portion of said heating element, said sleeve being made of material from the class consisting of polytetrafluoroethylene and polytrifluorochloroethylene.

10. Apparatus for heat sealing flaccid thermoplastic sheets, comprising first and second spaced electrical heating elements, the space between said elements being adapted to permit the passage of a pair of superposed thermoplastic sheets therethrough, a first pressure means disposed adjacent said first heating element and movable relative to said first heating element to and from a first position in which said first pressure means applies a force to said first heating element in the direction of said second heating element and to and from a second position in which said first pressure means is spaced from said first heating element, a second pressure means disposed adjacent said second heating element and movable relative to said second heating element to and from a first position in which said second pressure means applies a force to said second heating element in the direction of said first heating element and to and from a second position in which said second pressure means is spaced from said second heating element, the spaces between said first pressure means and said first heating element and between said second pressure means and said second heating element when said first and second pressure means are in their respective second positions each being adapted to permit the passage of a pair of superposed thermoplastic sheets therethrough, and means for concomitantly moving said first and second pressure means in opposite directions relative to their associated heating elements so that both said pressure means are simultaneously in their respective first positions and both said pressure mean are simultaneously in their respective second positions.

11. Apparatus for heat sealing flaccid thermoplastic sheets, comprising first and second spaced electrical heating elements, the space between said elements being adapted to permit the passage of a pair of superposed thermoplastic sheets therethrough, a first pressure means disposed adjacent said first heating element and movable relative to said first heating element to and from a first position in which said first pressure means applies a force to said first heating element in the direction of said second heating element and to and from a second position in which said first pressure means is spaced from said first heating element, a second pressure means disposed adjacent said second heating element and movable relative to said second heating element to and from a first position in which said second pressure means applies a force to said second heating element in the direction of said first heating element and to and from a second position in which said second pressure means is spaced from said second heating element, the spaces between said first pressure means and said first heating element and between said second pressure means and said second heating element when said first and second pressure means are in their respective second positions each being adapted to permit the passage of a pair of superposed thermoplastic sheets therethrough, and means for concomitantly moving said first and second pressure means in opposite directions relative to their associated heating elements so that both said pressure means are simultaneously in their respective first positions and both said pressure means are simultaneouly in their respective second positions, one of said heating elements being mounted for relative movement toward and away from the other of said heating elements in response to movement of said first and second pressure means from their second positions to their first positions and from their first positions to their second positions, respectively.

12. Apparatus for heat sealing flaccid thermoplastic sheets, comprising first and second spaced electrical heating elements, the space between said elements being adapted to permit the passage of a pair of superposed thermoplastic sheets therethrough, a first pressure means disposed adjacent said first heating element and movable relative to said first heating element to and from a first position in which said first pressure means applies a force to said first heating element in the direction of said second heating element and to and from a second position in which said first pressure means is spaced from said first heating element, a second pressure means disposed adjacent said second heating element and movable relative to said second heating element to and from a first position in which said second pressure means applies a force to said second heating element in the direction of said first heating element and to and from a second position in which said second pressure means is spaced from said second heating element, the spaces between said first pressure means and said first heating element and between said second pressure means and said second heating element when said first and second pressure means are in their respective second positions each being adapted to permit the passage of a pair of superposed thermoplastic sheets therethrough, and means for concomitantly moving said first and second pressure means in opposite directions relative to their associated heating elements so that both said pressure means are simultaneously in their respective first positions and both said pressure means are simultaneously in their respective second positions, a pair of springs operatively connected to the ends of one of said heating elements for yieldably mounting said one heating element for relative movement toward and away from the other of said heating elements in response to movement of said first and second pressure means from their second positions to their first positions and from their first positions to their second positions, respectively.

13. Apparatus for heat sealing flaccid thermoplastic sheets, comprising first and second spaced electrical heating elements, the space between said elements being adapted to permit the passage of a pair of superposed thermoplastic sheets therethrough, a first pressure means disposed adjacent said first heating element and movable relative to said first heating element to and from a first position in which said first pressure means applies a force to said first heating element in the direction of said second heating element and to and from a second position in which said first pressure means is spaced from said first heating element, a second pressure means disposed adjacent said second heating element and movable relative to said second heating element to and from a first position in which said second pressure means applies a force to said second heating element in the direction of said first heating element and to and from a second position in which said second pressure means is spaced from said second heating element, the spaces between said first pressure means and said first heating element and between said second pressure means and said second heating element when said first and second pressure means are in their respective second positions each being adapted to permit the passage of a pair of superposed thermoplastic sheets therethrough, and means for concomitantly moving said first and second pressure means in opposite directions relative to their associated heating elements so that both said pressure means are simultaneously in their respective first positions and both said pressure means are simultaneously in their respective second positions, a pair of springs for each heating element, each pair of springs being connected to the ends of one of said heating elements for yieldably mounting said heating elements for movement toward and away from each other in response to movement of said first and second pressure means from their second positions to their first positions and from their first positions to their second positions, respectively.

14. Apparatus for heat sealing flaccid thermoplastic sheets, comprising a plurality of spaced electrical heating elements, means for mounting said heating elements for movement to and from first relative positions in which said adjacent heating elements are spaced from one another and to and from second positions in which said heating elements are relatively close to one another, the space between each adjacent pair of heating elements when said heating elements are in their first relative positions each being adapted to permit the passage of a pair of superposed thermoplastic sheets therethrough, a first pressure means disposed adjacent one endmost heating element and movable relative thereto to and from a first position in which said first pressure means is spaced from said one endmost heating element and to and from a second position in which said first pressure means applies a force to said one endmost heating element in the direction of the heating element adjacent said one endmost heating element, the space between said first pressure means and said one endmost heating element when said first pressure means is in said first position being adapted to permit the passage of a pair of superposed thermoplastic sheets therethrough, a second pressure means disposed adjacent another endmost heating element and movable relative thereto to and from a first position in which said second pressure means is spaced from said other endmost heating element and to and from a second position in which said second pressure means applies a force to said other endmost heating element in the direction of the heating element adjacent said other endmost heating element, the space between said second pressure means and said other endmost heating element when said second pressure means is in said first position being adapted to permit the passage of a pair of superposed thermoplastic sheets therethrough, and means for concomitantly moving said first and second pressure means in opposite directions relative to their associated heating elements so that both said pressure means are simultaneously in their respective first positions and both said pressure means are simultaneously in their respective second positions.

15. Apparatus in accordance with claim 14, wherein said mounting means for said heating elements comprises a plurality of springs, one connected to each end of each of said heating elements, for subjecting said heating elements to tension.

References Cited in the file of this patent

UNITED STATES PATENTS

| | | |
|---|---|---|
| 2,307,344 | Zottu | Jan. 5, 1943 |
| 2,438,685 | Stevens | Mar. 30, 1948 |
| 2,682,294 | Langer | June 29, 1954 |
| 2,692,328 | Jaye | Oct. 19, 1954 |
| 2,767,769 | Hasselquist | Oct. 23, 1956 |
| 2,796,913 | Fener | June 25, 1957 |
| 2,822,030 | Pokras | Feb. 4, 1958 |
| 2,859,796 | Taunton | Nov. 11, 1958 |
| 2,918,106 | Fener | Dec. 22, 1959 |